United States Patent
Chan et al.

(10) Patent No.: US 7,237,446 B2
(45) Date of Patent: Jul. 3, 2007

(54) SYSTEM AND METHOD FOR MEASURING GAIT KINEMATICS INFORMATION

(76) Inventors: Raymond Chan, E10, Woodland Heights, 2 Wong Nai Chung Gap Road, Hong Kong (HK); Mun Hoong Leong, Blk A, Flat 1, 9/F, South Bay Garden, 33 South Bay Close, Repulse Bay, Hong Kong (HK)

( * ) Notice: Subject to any disclaimer, the term of this patent is extended or adjusted under 35 U.S.C. 154(b) by 0 days.

(21) Appl. No.: 11/228,121

(22) Filed: Sep. 16, 2005

(65) Prior Publication Data
US 2007/0062279 A1 Mar. 22, 2007

(51) Int. Cl.
*A61B 5/00* (2006.01)
*G01L 5/16* (2006.01)

(52) U.S. Cl. .................. 73/865.4; 73/509; 73/511

(58) Field of Classification Search ........... 73/488, 73/865.4, 509, 511
See application file for complete search history.

(56) References Cited

U.S. PATENT DOCUMENTS

| | | | | |
|---|---|---|---|---|
| 4,566,461 A | * | 1/1986 | Lubell et al. | 600/481 |
| 4,578,769 A | | 3/1986 | Frederick | |
| 5,125,412 A | * | 6/1992 | Thornton | 600/483 |
| 5,186,062 A | * | 2/1993 | Roost | 73/865.4 |
| 5,263,491 A | * | 11/1993 | Thornton | 600/587 |
| 5,314,389 A | * | 5/1994 | Dotan | 482/3 |
| 5,485,402 A | * | 1/1996 | Smith et al. | 702/160 |
| 5,636,146 A | | 6/1997 | Flentov et al. | |
| 5,724,265 A | * | 3/1998 | Hutchings | 702/141 |
| 5,749,372 A | * | 5/1998 | Allen et al. | 600/595 |
| 5,891,042 A | * | 4/1999 | Sham et al. | 600/483 |
| 5,955,667 A | * | 9/1999 | Fyfe | 73/490 |
| 5,976,083 A | * | 11/1999 | Richardson et al. | 600/300 |
| 6,018,705 A | | 1/2000 | Gaudet et al. | |
| 6,052,654 A | | 4/2000 | Gaudet et al. | |
| 6,135,951 A | * | 10/2000 | Richardson et al. | 600/300 |
| 6,145,389 A | * | 11/2000 | Ebeling et al. | 73/865.4 |
| 6,266,623 B1 | | 7/2001 | Vock et al. | |
| 6,298,314 B1 | | 10/2001 | Blackadar et al. | |
| 6,301,964 B1 | | 10/2001 | Fyfe et al. | |
| 6,356,856 B1 | | 3/2002 | Damen et al. | |
| 6,418,181 B1 | * | 7/2002 | Nissila | 377/23 |
| 6,493,652 B1 | | 12/2002 | Ohlenbusch et al. | |
| 6,498,994 B2 | | 12/2002 | Vock et al. | |
| 6,513,381 B2 | | 2/2003 | Fyfe et al. | |
| 6,513,532 B2 | * | 2/2003 | Mault et al. | 600/595 |
| 6,574,769 B1 | * | 6/2003 | Ramaswamy et al. | 714/776 |
| 6,611,789 B1 | | 8/2003 | Darley | |
| 6,856,934 B2 | | 2/2005 | Vock et al. | |
| 6,959,259 B2 | * | 10/2005 | Vock et al. | 702/142 |
| 7,062,225 B2 | * | 6/2006 | White | 455/41.2 |
| 7,092,846 B2 | * | 8/2006 | Vock et al. | 702/182 |
| 2001/0045128 A1 | * | 11/2001 | McCall et al. | 73/511 |
| 2002/0002863 A1 | * | 1/2002 | Slycke et al. | 73/488 |

(Continued)

*Primary Examiner*—Hezron Williams
*Assistant Examiner*—Samir M. Shah

(57) ABSTRACT

A system for measuring gait kinematics information during exercise of a subject comprising a fixing member adapted for fixing onto the trunk of the body of the subject; an acceleration sensor attached to the fixing member for sensing the vertical acceleration of the trunk of the body of the subject; and a microprocessor coupled to the acceleration sensor adapted to receive the vertical acceleration data from the acceleration sensor, and to compute and derive the speed and distance traversed by the subject, and to communicate the speed and distance information. In the preferred embodiment, a heart-rate monitoring device is also provided.

13 Claims, 8 Drawing Sheets

U.S. PATENT DOCUMENTS

2003/0005766 A1* 1/2003 Guzman ................... 73/491
2003/0043928 A1* 3/2003 Ling et al. ................ 375/267
2005/0033515 A1* 2/2005 Bozzone ................... 701/214
2006/0184301 A1* 8/2006 Konno et al. ............. 701/45

* cited by examiner

SYSTEM AND METHOD FOR MEASURING GAIT KINEMATICS INFORMATION

FIELD OF INVENTION

This invention relates to an exercise monitoring system and method, and in particular systems for measuring gait kinematics information.

BACKGROUND OF INVENTION

It is valuable for an exerciser to know his/her heart rate and speed information during exercise. Current Heart Rate and speed Monitor is either acceleration sensor based or GPS technology based. The acceleration sensor based heart rate and speed monitor is composed of a chest belt for heart rate measurement, a foot pad embedded with an accelerometer to measure speed and a wrist watch to display heart rate and speed information received separately from the chest belt and foot pad. This approach has the disadvantage of RF interference problem since the wrist watch will receive signal from both the chest belt (heart rate information) and foot pad (speed and distance information). This problem will get worse when two or more heart rate and speed monitor users are getting together and may result in inaccurate reading.

SUMMARY OF INVENTION

In the light of the foregoing background, it is an object of the present invention to provide an alternate gait kinematics measuring device.

In accordance with the object of the invention, one embodiment is a system for measuring gait kinematics information during exercise of a subject is provided comprising a fixing member (for example but not limited to a chest belt) adapted for fixing onto the trunk of the body of the subject; an acceleration sensor attached to the fixing member for sensing the vertical acceleration of the trunk of the body of the subject; and a microprocessor coupled to the acceleration sensor. The microprocessor is adapted to receive the vertical acceleration data from the acceleration sensor, and to compute and derive the speed and distance traversed by the subject, and to communicate the speed and distance information.

In one implementation, the system according to present invention further comprises a wireless transmission unit coupled to the microprocessor for transmitting the gait kinematics information. A receiving device is also provided including a receiving unit for receiving the gait kinematics information. In the most preferred embodiment, a receiving device is provided with a wireless receiver and a display unit for displaying the gait kinematics information. In an even more preferred embodiment, the receiving device is adapted for wearing on the wrist of the subject, such as a modified wrist watch, or wearing next to the ear of the subject, such as an earplug.

In another preferred embodiment, the system according to the present invention further includes a heart-rate monitoring device also fixed onto the chest belt and coupled to the microprocessor. The heart rate monitoring system may be a conventional system containing a set of electrodes that measures the electrocardiogram (ECG) signal of the subject, and capable of converting the ECG signal to digital pulses and communicate the digital pulses as the heart-rate value to the subject.

In the preferred implementation of this second embodiment, a wireless transmission unit coupled to the microprocessor is also provided for transmitting the gait kinematics information while a receiving device containing a receiving unit is provided for receiving the gait kinematics information. The receiving device may again be, for example, the wrist device or ear device as described in the previous embodiment.

In both embodiments, the wireless transmission means may be, but is not limited to, a radio-frequency transmitter, infra-red transmitter or sonar transmitter.

In a third embodiment of the present invention, there is provided a method of computing the speed and distance information from the digital vertical acceleration data comprising the following steps of obtaining vertical acceleration data of the trunk of the body of a subject during motion; and computing the speed and distance traversed by the subject based on the vertical acceleration data and calibration parameters obtained from a calibration event by the subject for a predetermined distance.

In a specific implementation example, the speed and distance traversed by the subject may be computed using the following steps:
1. subjecting the digital vertical acceleration data to a low-pass filter to produce the filtered acceleration data;
2. computing the change of acceleration by calculating the difference of the filtered acceleration data from the current time sample against the previous time sample;
3. accumulating the changes of acceleration for a time period to arrive at the accumulated acceleration changing rate;
4. computing the distance that the human subject has traversed by multiplying the accumulated acceleration changing rate by an amplitude-shift compensation factor and a time-shift compensation factor, and divided by a calibration constant based on calibration parameters obtained from a calibration event by the subject for a predetermined distance; and
5. computing the speed that the human subject has traversed by dividing the distance computed in step (d) by the time period of measurement.

The time-shift compensation factor may be derived from calculating the activity time $T_{ac}$ within a fixed time interval $T_c$, subtracting $T_c$ from $T_{ac}$ and dividing the result by $T_c$.

The calibration parameters may be derived by the following steps:
1. measuring the time it takes for the subject to traverse a fixed distance to obtain the calibration time period;
2. accumulating the changes of acceleration during the calibration time period to arrive at the calibration change of acceleration; and
3. dividing the calibrated change of acceleration by the calibration time period to obtain the calibration coefficient.

The amplitude-shift compensation factor may be derived from dividing the accumulated acceleration changing rate by a fixed time interval Tc, further dividing the result by an acceleration calibration value, adding one to the result, and dividing the sum by half according to equation (4) described below.

The acceleration calibration value may be further derived from dividing the calibration change of acceleration by the calibration time period.

One of the above-described embodiments of the present invention provides a solution that combines the heart-rate measuring apparatus and the acceleration sensor into one unit that can be worn on the trunk of the body. This unit can further transmit the gait kinematics information such as the heart-rate, the speed and the distance that the subject has traversed to a receiving device for the purpose of informing the subject about the kinematics information either in visual or audible form. This is a distinct advantage over conventional gait kinematics measuring devices with both heart rate and speed monitors in that the same unit provided on the chest belt is able to measure both parameters and therefore only a single transmission signal needs to be sent to the receiving device such as the wrist watch or earplug. In the conventional systems that use a speed measurement system mounted on the shoe, the signal generated by the heart rate monitor on the chest and the speed monitor on the shoe may interfere with each other.

Another advantage of the present invention is that no device is fixed onto the shoe of the user. Thus the user does not need to fix another device onto the shoe if the speed monitor is also mounted on the chest belt. Furthermore, no re-calibration of any kind is needed once the calibration on the chest belt is performed. Otherwise, conventional shoe monitors often require re-calibration when a new shoe is used.

DETAILED DESCRIPTION OF THE PREFERRED EMBODIMENTS

As used herein and in the claims, "couple" or "connect" refers to electrical coupling or connection either directly or indirectly via one or more electrical means unless otherwise stated.

Figure 1:
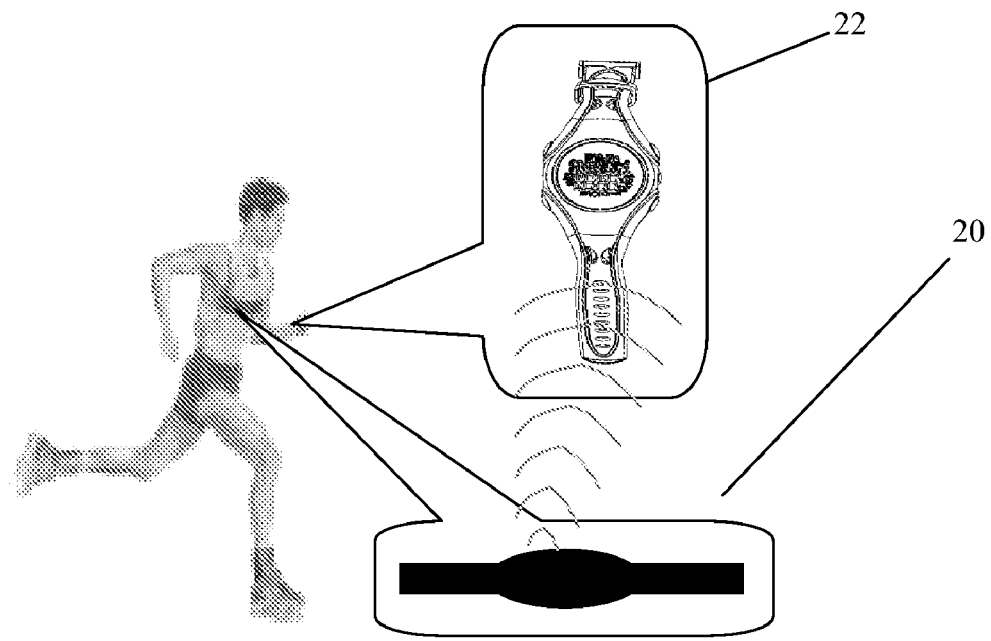
FIG. 1 is a schematic illustration of embodiment A of the invention.
Figure 2:
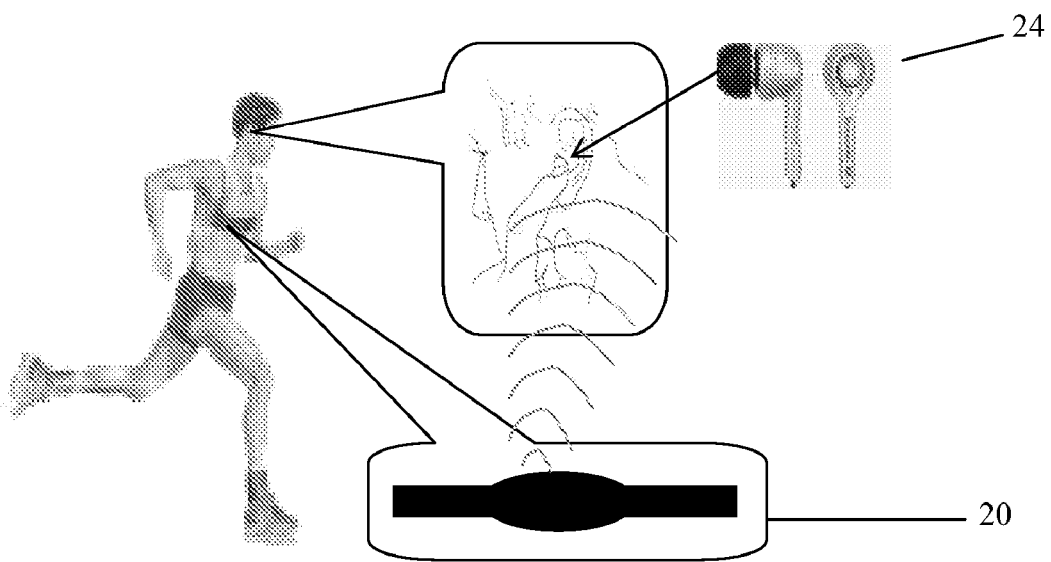
FIG. 2 is a schematic illustration of embodiment B of the invention.

As illustrated in FIGS. 1 and 2, the system in the preferred embodiment of the present invention includes one chest belt and receiving device such as a wristwatch or an earplug. The acceleration sensor is placed in the chest belt 20, so both the heartbeat, the speed and distance readings are computed at the chest belt, and the readings are either transmitted to the wrist watch 22 in a packet coded format (embodiment A shown in FIG. 1) or to an earplug 24 as an audio message (embodiment B shown in FIG. 2).

Figure 3:
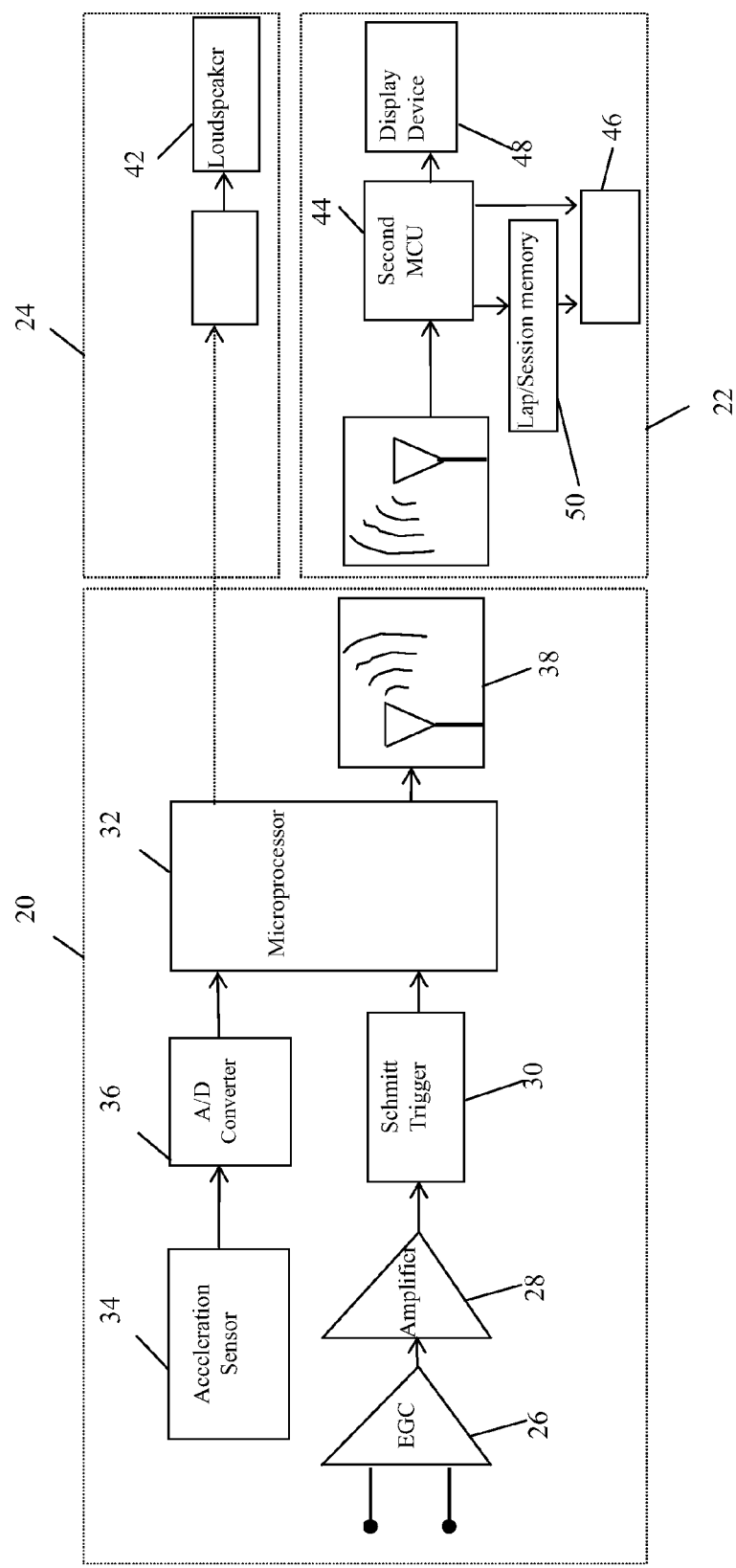
FIG. 3 is a system block diagram according to one embodiment of the present invention.

In the preferred embodiment of a system in the chest belt as shown in FIG. 3, the electrocardiogram device (ECG) 26, is adapted to detect the ECG signal which is then amplified by an amplifier 28 and converted to digital pulses by a Schmitt trigger module 30 and then sent to the Microprocessor Central processing Unit (MCU) 32. Separately, an acceleration sensor 34 collects vertical acceleration information which is passed through an Analog-to-Digital Converter (ADC) 36 before being sent to the MCU 32. The ADC samples the incoming acceleration waveform at a rate of 50 Hz. The MCU passes the data to a wireless transmitter 38 which then transmits the data to a receiving device. In one embodiment, the data is processed into a voice message and the audio signal is transmitted directly to an earplug 24 and output to a loudspeaker 42 that can be worn on the ear of a user. In another embodiment, the data is transmitted in the form of data packets to a receiver installed into the wrist watch 22 provided with a second MCU 44 which will display the gait kinematics information on a display device 48. The invention device can further include the Lap/session memory 50 and a download module 46 that can be PC-downloadable. Each memory can include the information like the total time, the average and maximum speed, the total distance, and average and maximum heart rate.

Figure 4A:
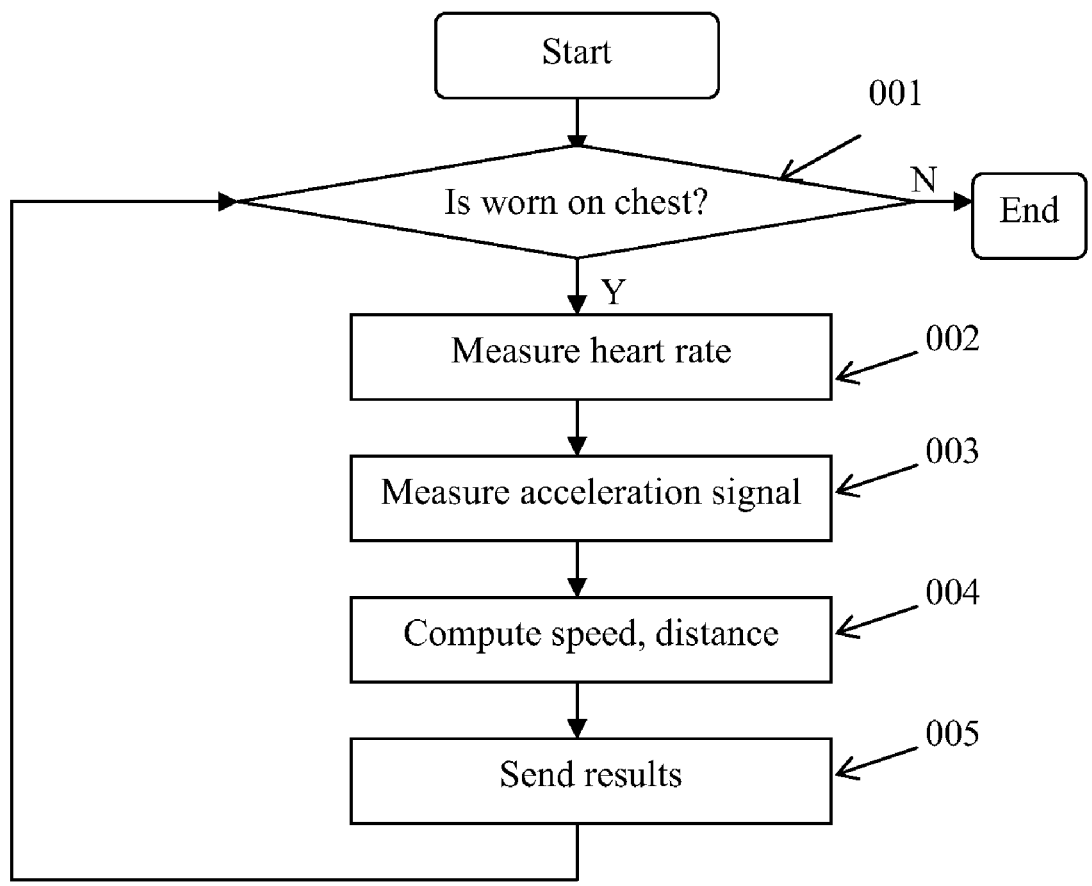
FIG. 4A is the main flow chart of the algorithm according to another embodiment of the present invention.

Turning first to the overall methodology as shown in FIG. 4.A, whenever the chest belt of the preferred embodiment is installed with batteries, it is ready to check the status as to whether the chest belt is on the chest in step 001. Once the device senses that the chest belt is worn on the chest of a human subject, the system starts to detect heart rate in step 002 and acceleration signal in step 003, then calculate in step 004 the actual heart rate value and distance or speed of the subject base on the certain algorithm described later. At two second-intervals, the chest belt would send the heart rate value and the speed/distance information either to the display device 48, or directly to the earplug 24 through wireless transmission means in step 005.

Figure 4B:
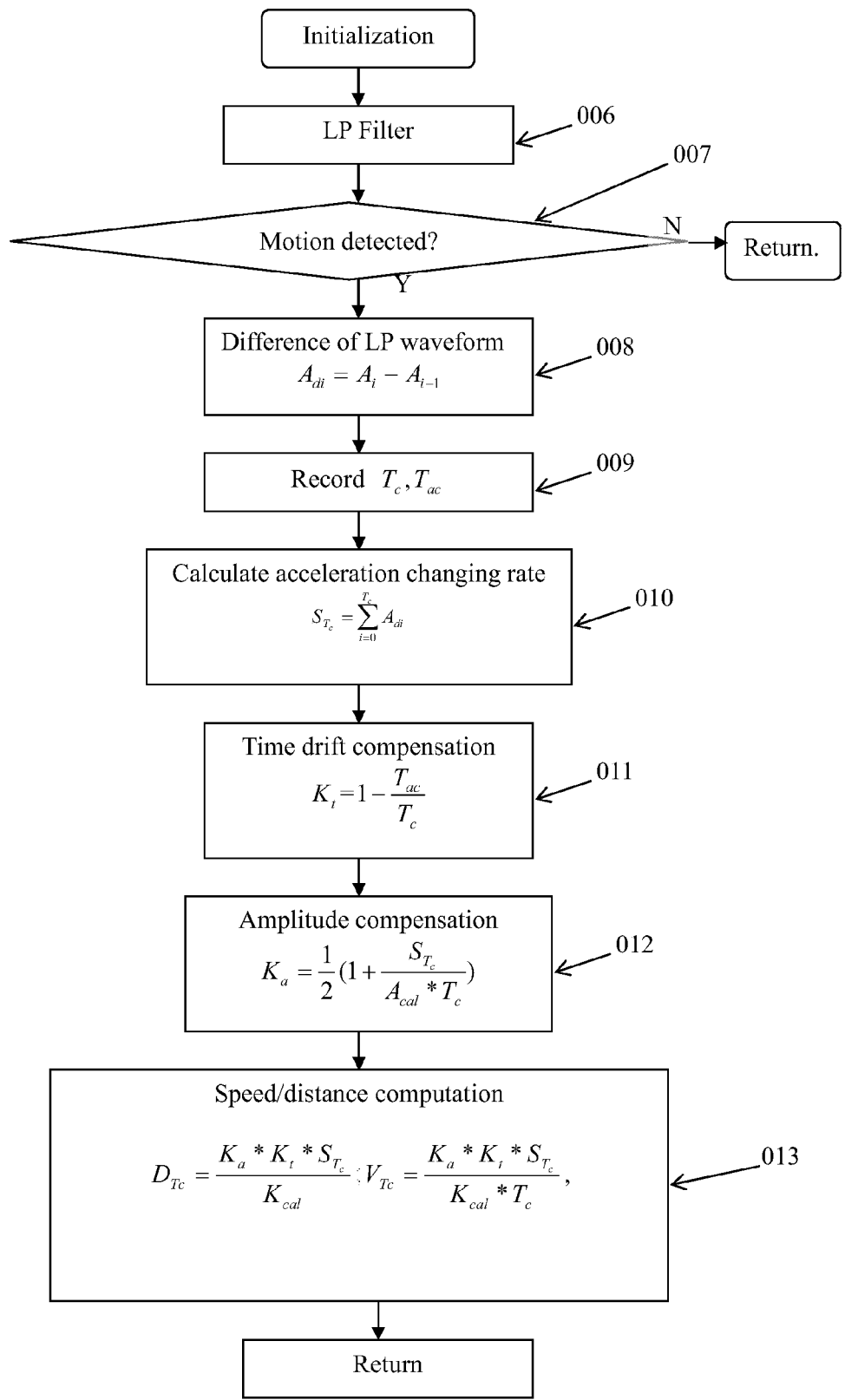
FIG. 4B is the flow chart of the speed/distance algorithm of the same embodiment of the present invention.

Turning now to the overall algorithm to calculate speed/distance information by MCU 32 of the chest belt device 20, it first performs low-pass filtering to the acceleration waveform in step 006 of FIG. 4B to remove the high frequency noise. The bandwidth of the low pass filter may be in the 0-16 Hz range. In the next step 007, the system determines if the user is exercising by comparing present acceleration to a threshold value that is a fraction of the gravitation acceleration g. Once the user motion is detected, the difference $A_{di}$ according to formula (1) is calculated in step 008 based on the acceleration waveform obtained after the low pass filter where $$A_{di} = A_i - A_{i-1} \tag{1}$$

1. $A_{di}$ is the acceleration signal-changing rate sequence.
2. $A_i$ and $A_{i-1}$ is acceleration separately at time i and time i-1

Once the acceleration signal-changing rate $A_{di}$ obtained, the system starts to record the time parameters $T_c$ and $T_{ac}$ in each periodic acceleration waveform in step 009, where $T_c$ is a fixed time interval for measuring $A_{di}$, and $T_{ac}$ is the activity time when the subject is in motion, and is the accumulation of those time intervals within $T_c$ that the absolute value of $A_{di}$ is higher than a threshold.

Then the acceleration changing rate $S_{T_c}$ in the $T_c$ time interval is calculated in step 010 based on record time $T_c$ and $A_{di}$.

$$S_{T_c} = \sum_{i=0}^{T_c} A_{di} \tag{2}$$

$A_{di}$ is the acceleration signal-changing rate sequence.
$T_c$ is the calculation cycle;

$S_{T_c}$ is sum to the acceleration signal-changing rate sequence in $T_c$ cycle.

The speed $V_{Tc}$ and the distance $D_{Tc}$ that the subject traversed in time $T_c$ is directly proportional to $S_{T_c}$. However, to accurately measure the speed and distance, this invention computes several compensation factors that apply to $S_{T_c}$ in order to reduce the error.

Firstly, a time drift compensation coefficient $K_t$ is calculated mainly based on $T_c$ and $T_{ac}$ in step 011 to eliminate the effect of acceleration waveform baseline drifting.

$$K_t = 1 - \frac{T_{ac}}{T_c} \qquad (3)$$

where $K_t$ is a coefficient of time shift compensation.
$T_c$ is a calculation cycle;
$T_{ac}$ is the activity time in $T_c$ Additionally, an amplitude compensating factor $K_a$ is calculated in step 012 based on the following formula:

$$K_a = \frac{1}{2}\left(1 + \frac{S_{T_c}}{A_{cal} * T_c}\right) \qquad (4)$$

where:

$K_a$ is a coefficient of amplitude shift compensation.
$S_{T_c}$ is sum to the acceleration signal-changing rate sequence in $T_c$ cycle.
$T_c$ is a calculation cycle;
$A_{cal}$ is a calibration parameter which will be described later.

Finally, the actual speed $V_{Tc}$ and distance $D_{Tc}$ is calculated using the equations below in step 013:

$$D_{Tc} = \frac{K_a * (1 - K_t) * S_{T_c}}{K_{cal}} \qquad (4)$$

$$V_{Tc} = \frac{K_a * (1 - K_t) * S_{T_c}}{K_{cal} * T_c} \qquad (5)$$

Where:

$D_{Tc}$ is the actual distance in $T_c$ cycle
$V_{Tc}$ is the actual speed in $T_c$ cycle
$S_{T_c}$ is sum to the acceleration signal-changing rate sequence in $T_c$ cycle;
$K_t$ is a coefficient of time shift compensation.
$K_a$ is a coefficient of amplitude shift compensation.
$K_{cal}$ is a calibration constant.

The calibration parameters $K_{cal}$, $A_{cal}$ in the above equations are calculated from a calibration session, which requires the user to wear the chest belt and run a certain distance D (e.g. 400 meters) and, during this calibration period Tcal, the entire acceleration waveform is recorded and analyzed. Based on the acceleration waveform, the following factors are calculated:

$$S_{cal} = \sum_{i=0}^{Tcal} (A_i - A_{i-1}) \qquad (6)$$

Where:

$S_{cal}$ is sum of the acceleration signal-changing rate in Tcal;
$A_i$ is acceleration waveform;
Tcal is the total time that the subject runs the distance D;
Then the other factors $K_{cal}$ and $A_{cal}$ are calculated as follows:

$$K_{cal} = \frac{S_{cal}}{D} \qquad (7)$$

Where: D is the known distance.

$$A_{cal} = \frac{S_{cal}}{Tcal} \qquad (8)$$

A specific example is now given to show how the algorithm calculates the distance and velocity of an exercising person.

Figure 5A:
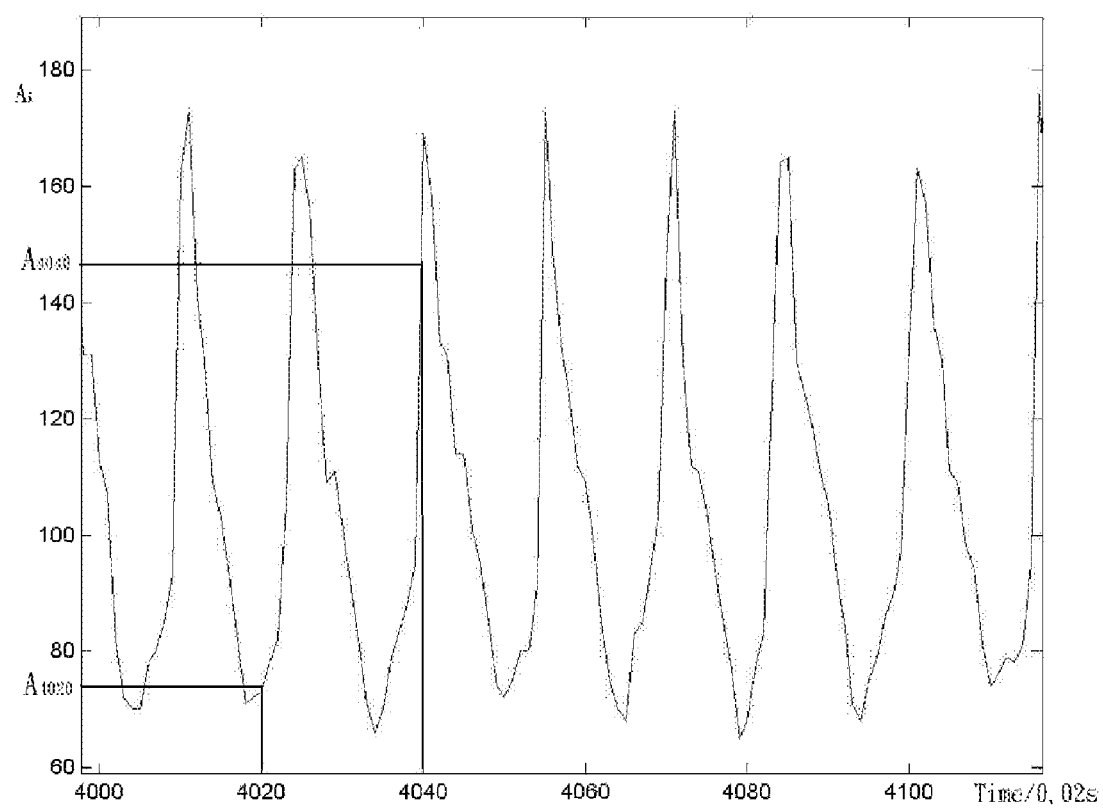
FIG. 5A is a plot of the acceleration waveform when running obtained according to the same embodiment of the present invention.
Figure 5B:
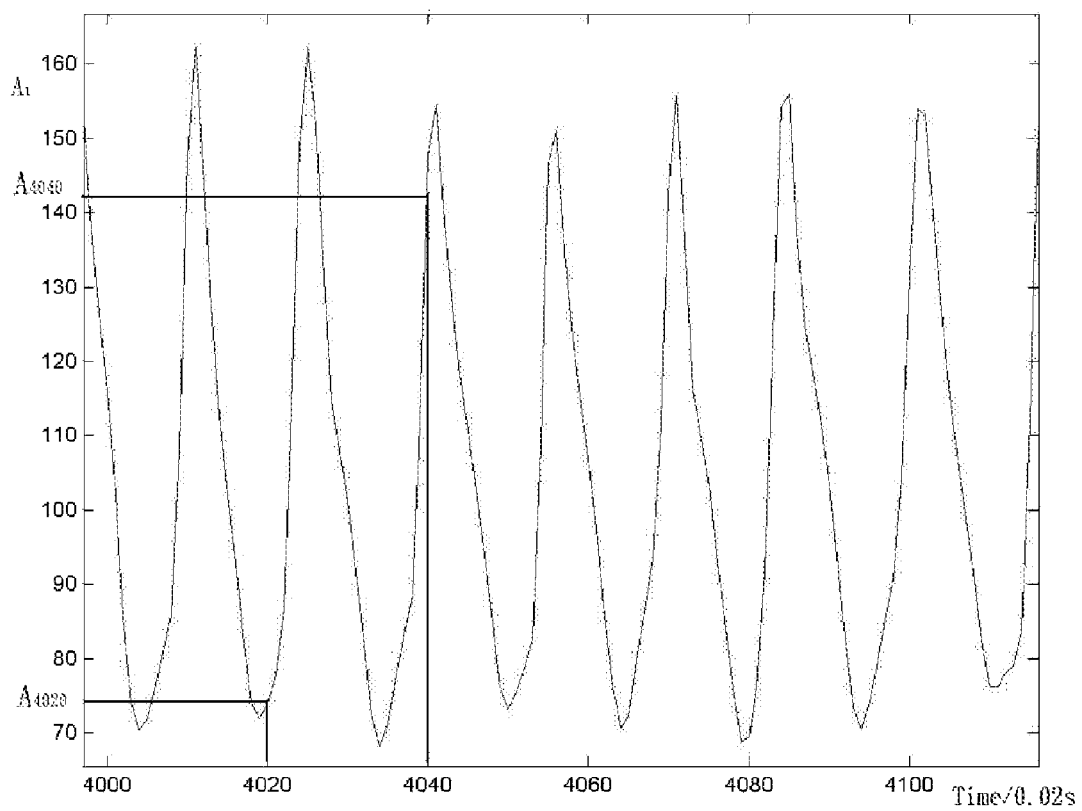
FIG. 5B is a plot of the acceleration waveform after low pass filtering obtained from FIG. 5A.
Figure 5C:
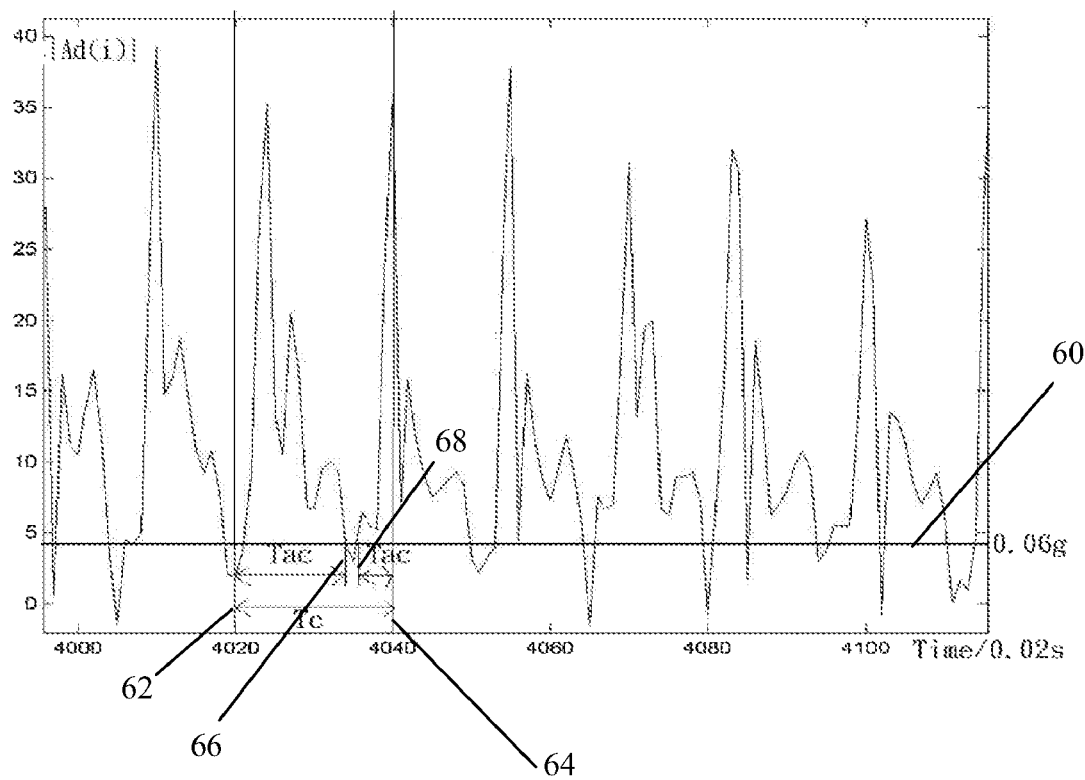
FIG. 5C is a plot of the acceleration signal changing rate computed from FIG. 5B according to equation (1).

When the user wearing the chest belt system 20 of the present invention is moving, the acceleration sensor 34 generates an acceleration waveform. The Analog-to-Digital converter 36 then digitizes this waveform at a rate of 50 Hz per second and then feeds it to the MCU 32. FIG. 5A shows a typical acceleration waveform when the subject is running. FIG. 5B shows the same waveform after low-pass filtering. The bandwidth of this low-pass filter is 0 to 16 Hz. FIG. 5C shows the absolute value of the acceleration signal-change rate $A_{di}$ as computed by equation (1). This figure shows that the calculation cycle $T_c$ starts from time sample 4020 and ends at time sample 4040. Within this period, the algorithm determines the activity time $T_{ac}$ by accumulating those time intervals that the absolute value of the acceleration signal-changing rate $A_{di}$ is higher than a threshold. In this embodiment, the threshold is set to 0.06 g as shown as line 60 in FIG. 5C, where g is the gravitational acceleration constant. In this particular case, $T_{ac}$ is the sum of two disjointed intervals—from line 62 to line 66, and from 68 to 64.

Figure 6A:
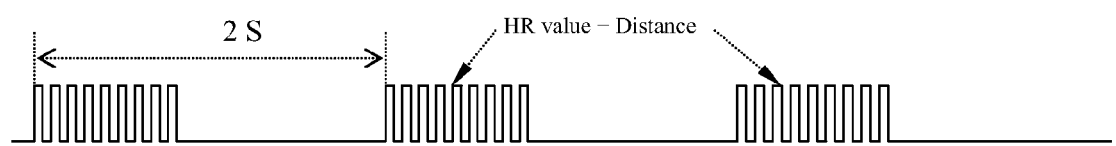
FIG. 6A is a diagram of the data packet transmission in two second intervals
Figure 6B:
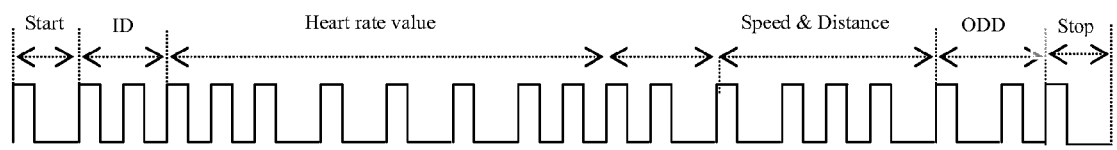
FIG. 6B is a diagram of the data-bit format in a data-frame

To solve the RF interference problem, in one embodiment of present invention whereby the heart rate, distance and speed information from the chest belt is transmitted to the wrist watch, it is transmitted as a data packet in a fixed interval, for example, every 2 seconds. And to ensure that this invention can withstand interferences in a multi-user environment whereby several users may wear similar device in closed vicinity, the data packet further contains additional information such as the user ID code, and the data packet error correction bits. FIG. 6A shows the data package transmission in a 2 second interval, and FIG. 6B further shows the data-bit format in a data frame. In FIG. 6B, the data package includes not only the heart-rate value and the speed and distance that the subject has traversed but also the ID code and the parity bits. When corrupted packets are received, the receiver decodes the error correction bit and warns the users of external interference by flashing some icons in the wrist watch display 48. The display will hold the current display until a clear signal is received again.

The preferred embodiments of the present invention are thus fully described together with a specific example. Although the description referred to particular embodiments and examples, it will be clear to one skilled in the art that the present invention may be practiced with variation of these specific details. Hence this invention should not be construed as limited to the embodiments set forth herein.

For example, the transmitter and receiver can be in many forms according to the user's need, while the data format can also be made according to needs.

What is claimed is:

1. A system for measuring gait kinematics information during exercise of a subject comprising:
   a fixing member adapted for fixing onto the trunk of the body of the subject;
   an acceleration sensor attached to the fixing member for sensing the vertical acceleration of the trunk of the body of said subject; and
   a microprocessor coupled to said acceleration sensor, said microprocessor configured to receive vertical acceleration data from said acceleration sensor, to compute and derive the speed and distance traversed by said subject using the algorithm of the form $$D_{Tc} = \frac{K_a * (1 - K_t) * S_{T_c}}{K_{cal}}$$

$$V_{Tc} = \frac{K_a * (1 - K_t) * S_{T_c}}{K_{cal} * T_c}$$

Wherein:
$D_{Tc}$ is the actual distance,
$V_{Tc}$ is the actual speed,
$S_{T_c}$ is the acceleration signal-changing rate,
$K_t$ is the time shift compensation factor,
$K_a$ is the amplitude shift compensation factor,
$K_{cal}$ is the calibration constant,
and to communicate said speed and distance information to a receiving device.

2. The system according to claim 1, further comprising a wireless transmission unit coupled to said microprocessor for transmitting said gait kinematics information; and said receiving device comprising a receiving unit for receiving said gait kinematics information.

3. The system according to claim 2, wherein said receiving device is adapted for attachment to the wrist of said subject and comprises a wireless receiver and a display unit for displaying said gait kinematics information.

4. The system according to claim 2, wherein said receiving device is adapted for wearing on the ear of said subject and comprises a wireless receiver and an earplug for audibly transmitting said gait kinematics information to said subject.

5. The system according to claim 2, wherein said wireless transmission unit is a radio-frequency transmitter, infra-red transmitter or sonar transmitter.

6. The system according to claim 1, further comprising a heart-rate monitoring device fixed onto said fixing member and coupled to said microprocessor.

7. The system according to claim 6, wherein said heart rate monitoring device comprises a set of electrodes that measure the electrocardiogram (ECG) signal of said subject, said heart rate monitoring device further capable of converting said ECG signal to digital pulses and means to communicate said digital pulses as a heart-rate value to said subject.

8. The system according to claim 6, further comprising a wireless transmission unit coupled to said microprocessor for transmitting said gait kinematics information; and said receiving device comprising a receiving unit for receiving said gait kinematics information.

9. The system according to claim 8, wherein said receiving device is adapted for attachment to the wrist of said subject and comprises a wireless receiver and a display unit for displaying said gait kinematics information.

10. The system according to claim 8, wherein said receiving device is adapted for wearing on the ear of said subject and comprises a wireless receiver and an earplug for audibly transmitting said gait kinematics information to said subject.

11. The system according to claim 8, wherein said gait kinematics information is transmitted in a data packet from said transmission unit to said receiving unit of said receiving device.

12. The system according to claim 11, wherein said data packet further comprises ID and error-correction bits so as to combat data transmission error during wireless transmission.

13. The system according to claim 8, wherein said wireless transmission unit is a radio-frequency transmitter, infra-red transmitter or sonar transmitter.

* * * * *